United States Patent [19]
Milton

[11] 3,937,557

[45] Feb. 10, 1976

[54] STAR COUPLER FOR SINGLE MODE FIBER COMMUNICATION SYSTEMS

[75] Inventor: A. Fenner Milton, Washington, D.C.

[73] Assignee: The United States of America as represented by the Secretary of the Navy, Washington, D.C.

[22] Filed: Nov. 29, 1974

[21] Appl. No.: 528,538

[52] U.S. Cl. .................. 350/96 C; 350/175 GN
[51] Int. Cl.² .......................................... G02B 5/16
[58] Field of Search ....... 350/96 C, 96 GN, 175 GN

[56] References Cited
UNITED STATES PATENTS

| | | | |
|---|---|---|---|
| 2,981,826 | 4/1961 | Mattern | 350/96 C X |
| 3,756,688 | 9/1973 | Hudson et al. | 350/96 C |

*Primary Examiner*—Archie R. Borchelt
*Attorney, Agent, or Firm*—R. S. Sciascia; A. L. Branning; M. L. Crane

[57] ABSTRACT

An optical coupler system in which optical communications from separate centers are transmitted over separate lines of a single optical fiber to a coupler which combines the information and transmits the combined information over different single fibers to other communication centers.

1 Claim, 1 Drawing Figure

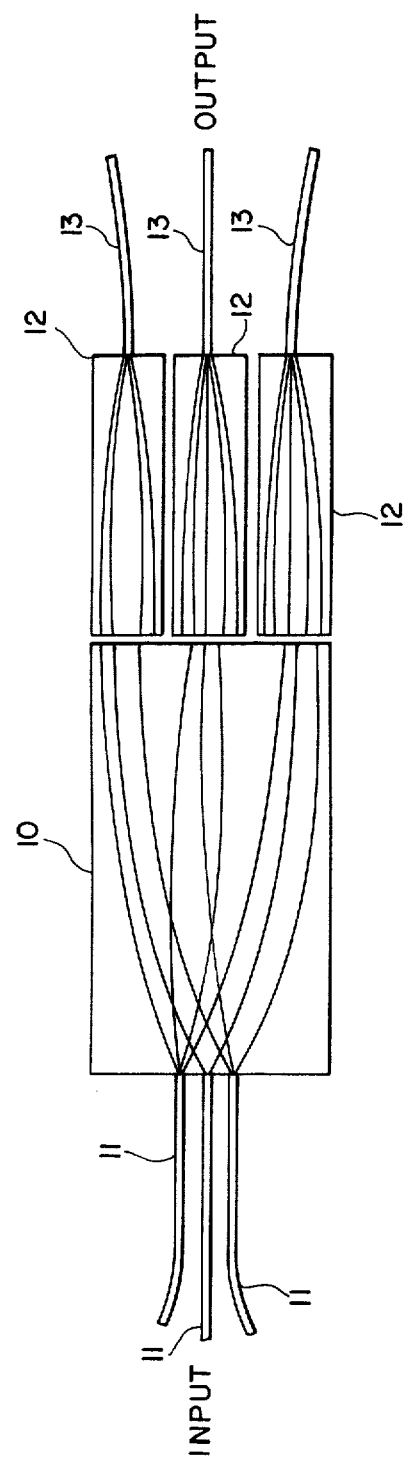

STAR COUPLER FOR SINGLE MODE FIBER COMMUNICATION SYSTEMS

BACKGROUND OF THE INVENTION

This invention is directed to radiation couplers more particularly to a radiation coupler for coupling radiation from a single fiber optic data transmission line to another single fiber optic data transmission line while permitting a controlled amount of radiation to be coupled off to other transmission lines.

Heretofore optical radiation couplers have been used in multimode optical fiber transmission lines to couple radiation from one or more lines to other lines by use of straight through couplers, T-couplers etc. Optical radiation has been transmitted over single fiber optic lines in ornamental designs, in hair pieces, in optical systems in automobiles, and airplanes as well as other areas.

Optical data communication systems have been proposed for transmitting data over fiber optic lines from one point to another. In transmitting data, couplers are used to couple broken lines together, to couple radiation to other lines, to add radiation and to take off radiation for transmission to other points. Optical radiation is normally transmitted over a multimode fiber optic bundle which requires couplers for the same.

SUMMARY OF THE INVENTION

This invention makes use of a number of different Selfoc lenses with indefinite working distance to couple light from each of a different number of input fibers substantially evenly to a different number of output fibers. A large diameter Selfoc lens transfers incoming radiation to smaller diameter Selfoc lenses which focuses the radiation onto different single fiber transmission lines.

BRIEF DESCRIPTION OF THE DRAWING

The FIGURE illustrates a side view of the optical coupler with transmission lines secured thereto.

DETAILED DESCRIPTION OF THE INVENTION

Now referring to the drawing there is shown by illustration a coupler for single fiber communication systems. As shown, the system includes a large diameter Selfoc lens 10 to which one or more multimode optic fibers 11 are optically connected. Radiation from the multimode transmission line is directed through the large diameter Selfoc lens which scrambles the radiation from the multimode optic fibers over its length and distributes the radiation uniformly over the entire output end of the large diameter lenses. Optically connected to the output end of the large diameter Selfoc lenses area plurality of smaller diameter Selfoc lenses 12 which receives the scrambled radiation and focuses the received radiation to a single optical fiber 13 optically connected one of each to each of the plurality of smaller diameter Selfoc lenses. The radiation is evenly distributed over the input ends of each of the plurality of smaller diameter lenses which focuses the radiation to its output end and into the individual optical fibers optically connected thereto.

The large diameter Selfoc lens ensures that the radiation from any individual input fiber is distributed evenly over each of the output fibers.

Couplers as described above avoid multiple throughput losses inherent in conventional data buss approaches. The throughput loss is only taken once no matter how many terminals are hooked onto the coupler.

A Selfoc lens is a lens made from a radiation transparent material cylindrical rod with a parabolic variation of optical index of refraction with an infinite working distance. The operation of the Selfoc lens is reciprocal in operation, i.e., radiation is focused to a point or it is expanded and collimated. A Selfoc lens is a light focusing glass device which is a trade name of the Nippon Sheet Glass Co. Ltd. and Nippon Electric Co. Ltd., Opaka, Japan.

Since the coupler system is reciprocal, radiation directed onto the large diameter Selfoc lens is scrambled and directed evenly on a number of individual optical fibers for transmission elsewhere. Likewise radiation could be transmitted by each of the individual fibers onto the Selfoc Lenses through the coupler and focused onto a multimode fiber optic lens for transmission elsewhere.

In carrying out the teaching of this invention, optic fiber transmission lines having a diameter of from about 50 microns to 300 microns may be used. The large diameter Selfoc lens has a diameter of about 2.5 millimeters and the smaller diameter Selfoc lens has a diameter of about 1 millimeter.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. A coupler for a multiterminal fiber optic communication system which comprises:
    a large constant diameter cylindrical, elongated, lens having a light focusing end and light collimating end,
    a plurality of small constant diameter cylindrical, elongated, lenses each containing a light focusing end and a light collimating end each secured in end-to-end relationship in optical alignment with said large diameter lens in parallel relationship with each other with said collimating end of said small diameter lenses adjacent said collimating end of said large diameter lens for receiving collimated light therefrom,
    whereby radiation from a plurality of fiber optic transmission lines incident on the focusing end of said large diameter lens is scrambled together along the length thereof and directed into collimated light at the collimated end thereof, and
    each of said plurality of small diameter lenses receive a portion of the radiation scrambled by said large diameter lens on their light collimating end and focuses the received scrambled radiation along their length to a point at their focusing end for transmission over separate single optic fiber transmission lines connected to the focusing end thereof.

* * * * *